United States Patent
Barrios et al.

(10) Patent No.: US 7,296,787 B2
(45) Date of Patent: Nov. 20, 2007

(54) RETRACTABLE SUPPORT APPARATUS AND METHOD

(75) Inventors: Jose Barrios, Owatonna, MN (US); Dennis Hanson, Medford, MN (US); Eric Adamson, Owatonna, MN (US)

(73) Assignee: SPX Corporation, Charlotte, NC (US)

( * ) Notice: Subject to any disclaimer, the term of this patent is extended or adjusted under 35 U.S.C. 154(b) by 260 days.

(21) Appl. No.: 11/125,071

(22) Filed: May 10, 2005

(65) Prior Publication Data
US 2006/0231696 A1    Oct. 19, 2006

Related U.S. Application Data

(60) Provisional application No. 60/665,880, filed on Mar. 29, 2005.

(51) Int. Cl.
*B25B 1/20*    (2006.01)
(52) U.S. Cl. ..................... 269/17; 254/133 R
(58) Field of Classification Search ............ 269/17, 269/296, 71; 254/133 R, 134
See application file for complete search history.

(56) References Cited

U.S. PATENT DOCUMENTS

| | | | | |
|---|---|---|---|---|
| 5,141,211 A | * | 8/1992 | Adams, Jr. ................ | 269/16 |
| 5,505,425 A | * | 4/1996 | Shelton ..................... | 248/670 |
| 6,089,545 A | * | 7/2000 | Norman et al. ............ | 254/134 |
| 6,357,986 B1 | * | 3/2002 | Sonnamaker et al. ...... | 414/343 |
| 6,533,260 B1 | * | 3/2003 | Mock ........................ | 269/17 |

* cited by examiner

*Primary Examiner*—Lee D. Wilson
(74) *Attorney, Agent, or Firm*—Baker & Hostetler LLP

(57) ABSTRACT

A motor vehicle component support and method that includes reciprocating horizontal members that maintain the vehicle component in balance as the support is adjusted according to the component size. With the reciprocating action, the adjustments to one horizontal member are identically and automatically performed on the other horizontal member. In addition, the apparatus includes cushions capable of pivoting to better accommodate components of irregular geometries.

18 Claims, 4 Drawing Sheets

RETRACTABLE SUPPORT APPARATUS AND METHOD

CROSS-REFERENCE TO RELATED APPLICATIONS

This application claims priority to provisional U.S. patent application entitled, RETRACTABLE SUPPORT APPARATUS AND METHOD, filed Mar. 29, 2005, having application Ser. No. 60/665,880, now pending, the disclosure of which is hereby incorporated by reference in its entirety.

FIELD OF THE INVENTION

The present invention relates generally to an apparatus and method for servicing a vehicle. More particularly, the present invention relates to vehicle component supports.

BACKGROUND OF THE INVENTION

For all motor vehicles requiring service, a mechanic may lower or raise a vehicle component from a vehicle housing to or from a servicing level. Due to the weight and size of vehicle components and of the confined space that exists under a vehicle, devices have been introduced in the past to assist mechanics with the task of removing and installing these components. Typical vehicle components requiring the assistance of such devices include fuel tanks, engines, and transmissions.

Furthermore, it is common knowledge that after a certain amount of usage of commercial and recreational vehicles, certain of these automotive components wear down or breakdown and need repair or replacement. Because of the weight, size and shape of such components, and the confined space in which a mechanic must ordinarily work, handling of such components, when being removed or installed is time-consuming, strenuous and dangerous unless a properly designed mechanical device is employed.

A conventional mechanical device such as a saddle adapter or fuel tank adapter, is generally unsatisfactory for this purpose because of its failure to provide adequate support with the resulting danger that the removed component may topple from the device and injure the mechanic. In particular, with fuel tanks, there is the added danger that fuel may spill out of the tank and cause a fire or an explosion. In addition, use of conventional saddle adapter may be objectionable because it requires laborious and time-consuming efforts of the mechanic and usually requires assistance by another mechanic in removing or installing the automotive component being repaired. The additional effort and assistance are necessary because conventional saddle adapters do not provide a means to safely and securely balance the particular vehicle component during servicing or when it is returned to its original position. Further, conventional saddle adapters have four legs for retaining a particular vehicle component. Adjustments may be made at a variety of locations of the leg to accommodate a variety of sizes. However, as each location is adjusted, a dangerous and precarious situation of imbalance can be created if the adjustments are even slightly incorrect. Accordingly, use of these prior-art adapters is costly due to the relatively high cost of labor.

This potential danger may be addressed by having another mechanic assist in adjusting a corresponding location at the same time. However, danger still exists with issues of timing, miscommunication and human error which may nevertheless result in toppling of the vehicle component and injury to the mechanic. This also results in greater cost in that the more people that are required to assist, the greater the labor cost.

Accordingly, it is desirable to provide a method and apparatus that is safe to use in the handling of vehicle components and lowers costs.

SUMMARY OF THE INVENTION

The foregoing needs are met, to a great extent, by the present invention, wherein in one aspect an apparatus is provided that in some embodiments there is a vehicle component support apparatus that includes a base that can be mounted on another surface; at least two guide tubes coupled to the base; at least two perforated tubes received in the at least two guide tubes; a sprocket that interacts with the at least two perforated tubes to allow reciprocal movement of the at least two perforated tubes; and a pad assembly to support a vehicle component and coupled to the at least two perforated tubes.

In accordance with another embodiment of the present invention, there is a method of securing a vehicle component, including positioning the vehicle component on a support apparatus having at least two guide tubes that receive at least two perforated tubes therein, wherein the at least two perforated tubes are coupled to a plurality of pad assemblies; and adjusting the at least two perforated tubes reciprocally by moving one of the perforated tubes so that a sprocket interacts with the other perforated tube thereby correctly positioning the pad assemblies to support the vehicle component.

In accordance with yet another embodiment of the present invention, there is a system for supporting a vehicle component, that includes: a means for supporting that can be mounted on another surface; at least two means for guiding coupled to the means for supporting; at least two perforated means for moving a pad assembly that supports the vehicle component, wherein the at least two perforated means for moving are received in the means for guiding; and a means for reciprocal movement that interacts with the at least two perforated means to move them reciprocally.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Two support frames placed in parallel and connected to each other by a synchronizing sprocket, are presented whereby when one frame is moved in one direction, the other frame reciprocates and moves in the opposite and equal direction. The amount of the displacement of one frame is equivalent to that of the other frame.

Figure 1:
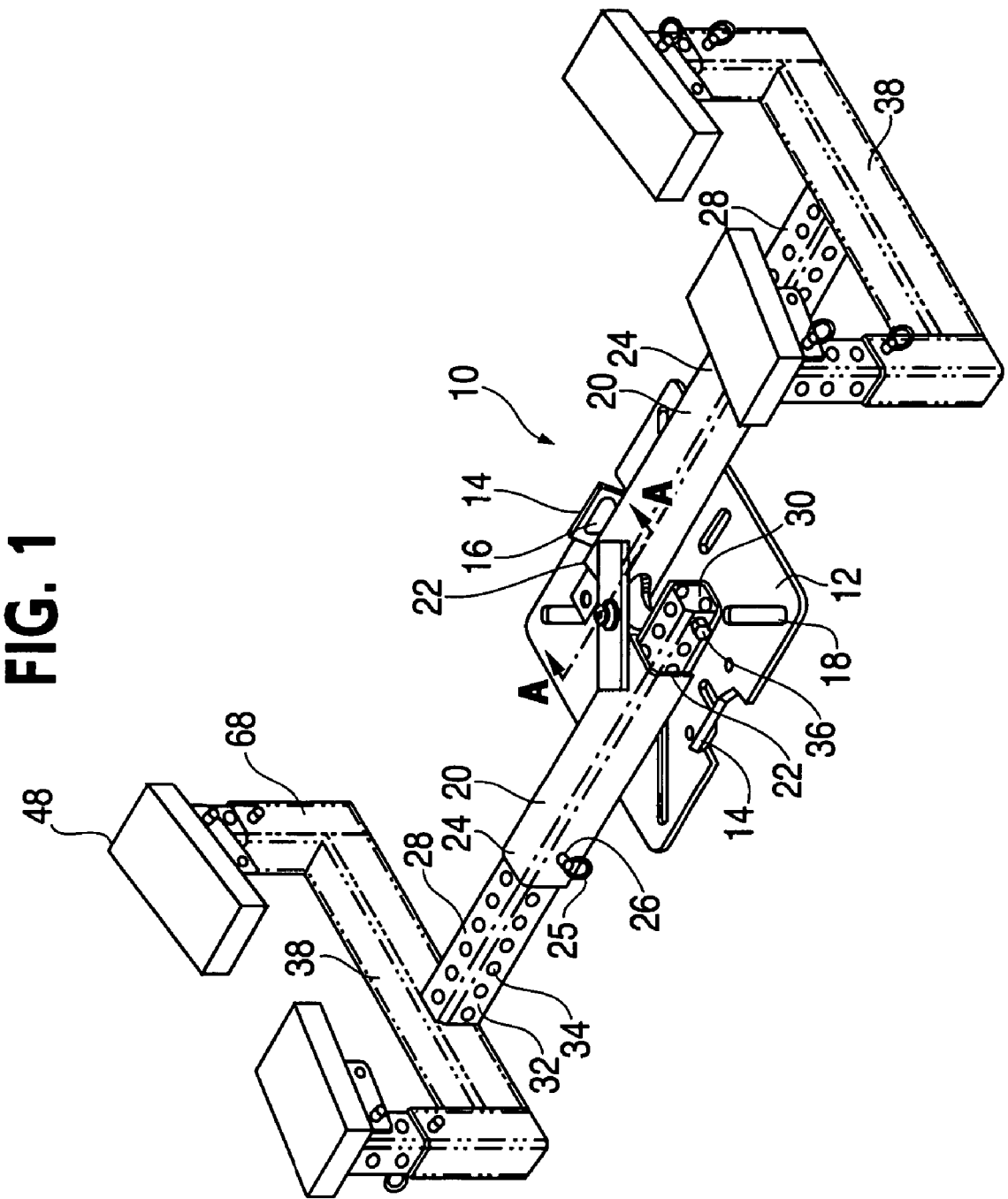
FIG. 1 is a perspective view illustrating a support apparatus according to a preferred embodiment of the invention.

An embodiment of a support apparatus 10 is illustrated in FIG. 1. The support apparatus 10 includes a base weldment 12 that is used to mount the support apparatus 10 to other devices, such as a work bench or a jack. The base weldment 12 also contains two stirrups 14 located on opposing ends of the base weldment 12 that are angled away from the base weldment 12. The stirrups 14 contain slots 16 through which a restraining strap (not shown) may be inserted to further secure a vehicle component being supported. The restraining strap may be inserted into one of the stirrup 14, then placed over the vehicle component and inserted into the other stirrup 14 to secure the vehicle component.

The base weldment 12 can be secured to other surfaces, such as a transmission jack or a work bench through mounting slots 18. Although there are four mounting slots 18 at each corner of the base weldment 12 illustrated, as one skilled in the art will appreciate, any number of mounting slots 18 may be used and in any configuration as needed by a user.

The support apparatus 10 includes two parallel guide tubes 20. The guide tubes 20 extend in opposing directions and have a first end 22. The first end 22 mounts to the base weldment 12 through welding or any such permanent means. In addition, guide tubes 20 are hollow tubes and may include perforations therein. The guide tubes 20 have a second end 24 that is not mounted to the base weldment 12. A person skilled in the art would recognize that the second end 24 can be mounted on the base weldment 12 if desired. The guide tubes 20 contain an opening 26, through which a hitch pin 25 or other secure means may be inserted.

The support apparatus 10 further includes two perforated tubes 28 that are received and displaceable within the guide tubes 20. The perforated tube 28 has a first end 30 and a second end 32. The perforated tube 28 may be longer than the guide tube 20 and is inserted into guide tube 20, such that the perforated tube 28 rests axially within the guide tube 20 and extends beyond the guide tube 20. The first end 30 of the perforated tube 28 may lay on the base weldment 12 and may have a stop bolt 36 attached thereto that prevents the perforated tube 28 from slipping out of the guide tube 20. The stop bolt 36 is mounted preferably at the last perforation on the tube 28 and can abut against a side wall of the guide tube 20 when the perforated tube 28 is fully extended.

The perforated tube 28 may slide axially within the guide tube 20 and contain numerous openings or perforations 34. These perforations 34 allow for a variety of lengths of the support apparatus 10 by extending or shortening the perforated tube 28. Also, the hitch pin 25 secures the perforated tube to the guide tube at any one of the perforations 34 on the perforated tube 28. Thus, once the desired length of the support apparatus 10 is achieved, the hitch pin 25 is inserted at the appropriate perforation, and temporarily fixes the perforated tube to the guide tube at the desired length. The perforations 34 are shown equally spaced but may be of any desired spacing. Although, FIG. 1 illustrates a square tube with perforations on all four sides, one skilled in the art will readily appreciate that any manner of tube, including circular shaped tube, may be used that allows for a variety of attachments at various lengths as embodied in this invention.

The perforated tube 28 connects orthogonally to cross tubes 38. Cross tubes 38 may or may not be hollow or contain perforations. The cross tube 38 at each end connects to a pad assembly 48 via a vertical guide tube 68, which is further discussed in FIG. 3.

Figure 2:
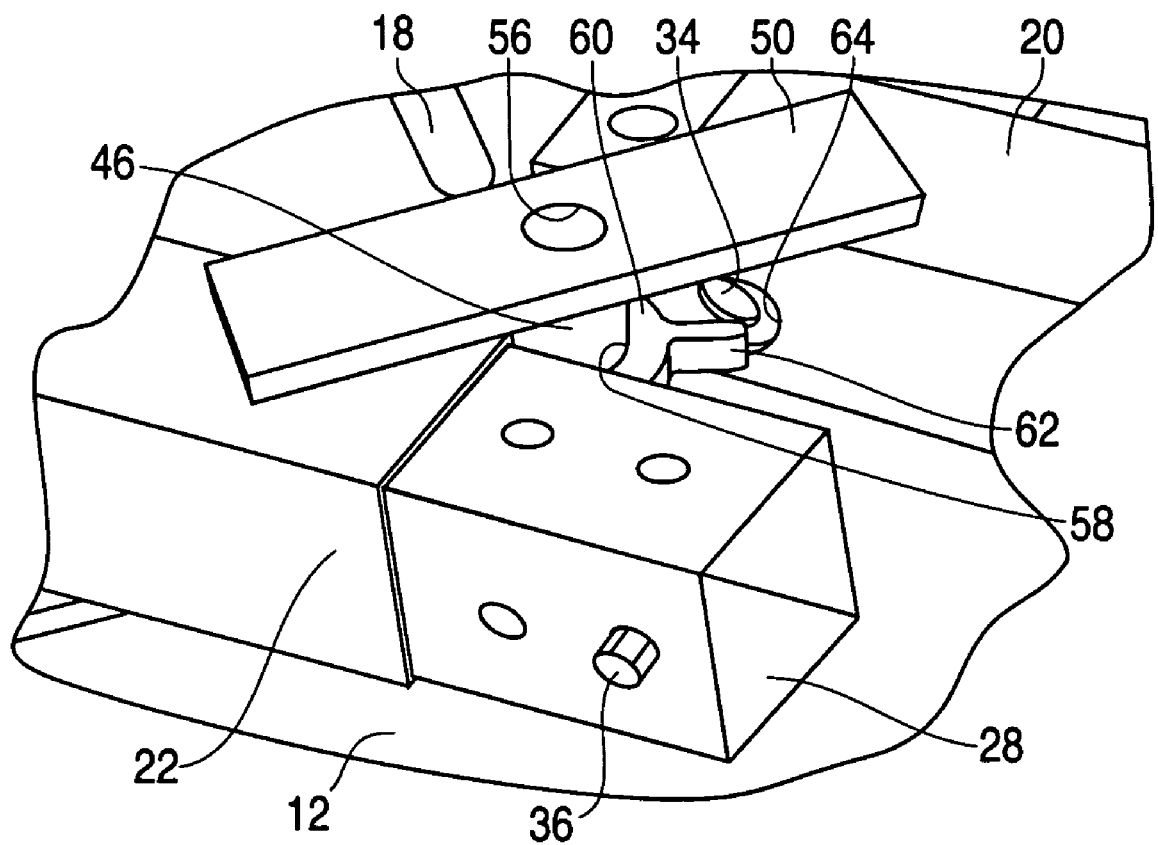
FIG. 2 is a detail view of a sprocket assembly at the center of the support apparatus of FIG. 1.

FIG. 2 is a perspective detail view of the center of the support apparatus 10 with the base weldment 12 and a sprocket assembly 46. This figure illustrates one embodiment in which the guide tubes 20 are coupled to each other via the sprocket assembly 46. The distance between the guide tubes 20 may be defined by the sprocket assembly 46. A sprocket 60 includes sprocket teeth 62, which are constructed and arranged to fit perforations 34 of the perforated tube 28. The spacing between the teeth 62 corresponds to the distance between the perforations 34. Guide tubes 20 further include an opening 64 at the first end 22 to allow for the sprocket teeth 62 to engage the perforations 34 of the perforated tube 28.

The support apparatus 10 couples the guide tubes 20 to each other through the use of a metallic bar 50 that may be welded at each end to the first end 22 of the tubes or by other secured means. The bar 50 includes an opening 56 at its center to receive a sprocket shaft 58 (partially shown) that itself is received in the sprocket 60. The sprocket shaft 58 may have at one end threads for threading into the base weldment 12 so that it does not rotate when the sprocket 60 is rotated during use. Below the bar 50 is the sprocket assembly 46 which is the reciprocating means for the support apparatus 10. The perforated tube 28 has the stop bolt 36 that prevents the perforated tube from being accidentally removed from the support apparatus 10.

The support apparatus 10 functions to accommodate a variety of dimensions of vehicle components in the following manner. As the perforated tube 28 is extended or retracted from a center of the support apparatus 10 represented by the base weldment 12, the sprocket teeth 62 engages the perforations 34 of the perforated tubes 28, respectively. When perforated tube 28 is pulled outwardly away (extended) from the base weldment 12, the sprocket 60 turns in a clockwise manner. This clockwise motion acts to displace the other perforated tube in an equal and opposite direction.

When the user wishes to shorten the support apparatus 10, the user may push the perforated tube 28 inwardly toward the base weldment 12 and the sprocket 60 then turns in a counter-clockwise manner. This motion serves to also translate the other perforated tube 28 inwardly and equally towards the base weldment 12, and thereby shortening the length of the support apparatus 10. Thus, the sprocket 60 allows for the reciprocating action of the support apparatus 10. This reciprocating action allows for more precise adjustments of the various pieces of the support apparatus so that the vehicle component can be better supported than conventional support devices.

It should also be noted that the direction of rotation of the sprocket described here may move in opposite directions. It can be recognized by a person skilled in the art that the clockwise rotation may be in other embodiments counter clockwise and that the counter clockwise rotation be clockwise. Additionally, the user can also move other parts of the support apparatus 10 to have the reciprocating effect and is not required to move only the perforated tube 28.

Figure 3:
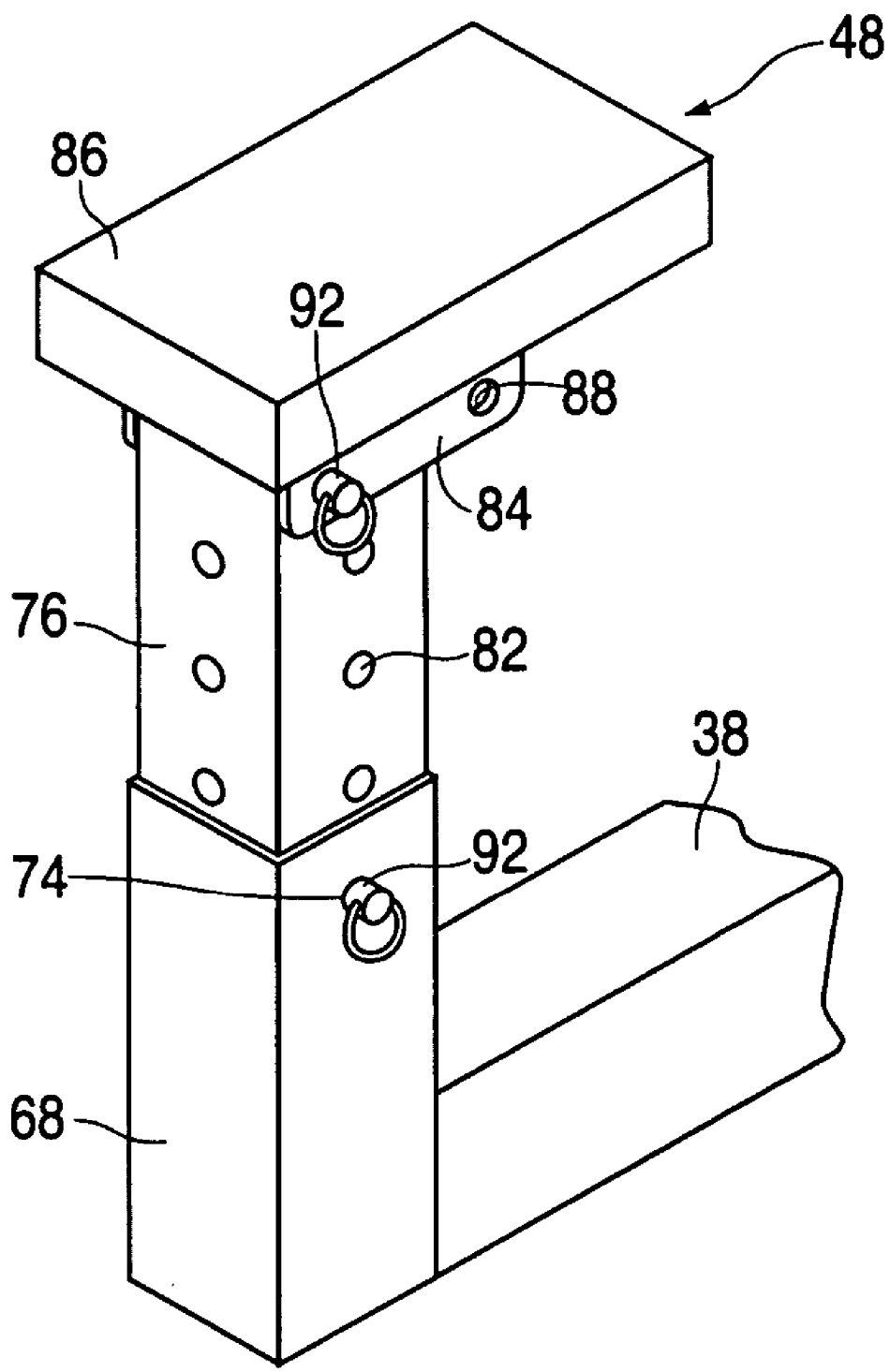
FIG. 3 is a perspective view of a pad assembly of FIG. 1.

FIG. 3 is a detailed view of one of the pad assembly 48 with a pad 86 attached to a pad bracket 84. The pad 86 is used to cushion and brace the vehicle component. The pad bracket 84 contains at least two positioning holes 88 that may be used to attach the pad assembly 48 to a vertical perforated tube 76. A hitch pin 92 may be used to attach the pad assembly 48 to the vertical perforated tube 76 via positioning holes 88 to one of the perforations 82 on the vertical perforated tube 76. Depending on which of the positioning holes is selected, the pad assembly 48 may pivot at an angle to the horizontal to better accommodate the vehicle component. The vertical tube 76 can be received in a vertical guide tube 68, which is connected to the cross tube 38.

These vertical guide tubes 68 are similar in nature and structure as the guide tubes 20 and can include at least one hole 74 to receive the hitch pin 92 to adjust the height of the vertical perforated tube 76. The vertical perforated tube 76 is similar in nature and manner as the perforated tube 28. This vertical perforated tube 76 may slide axially within the vertical guide tube 68. The vertical perforated tube 76 permits a variety of heights for the support apparatus 10 through the raising or lowering of the vertical perforated tube 76. The hitch pin 92 can be used to secure the height of the vertical perforated tube as desired by the user.

As there are four pad assembly 48, it will be appreciated that there are then four vertical guide tubes 68, one at each respective corner of the support apparatus 10 marked at 90° angles from each other. However, it will be appreciated by one skilled in the art that there may be additional pad assembly 48, pad bracket 84, cross tubes 38, hitch pin 92, vertical perforated tube 76, vertical guide tube 68 and their corresponding holes (components), and their respective placement as needed that properly balances the vehicle component.

Figure 4:
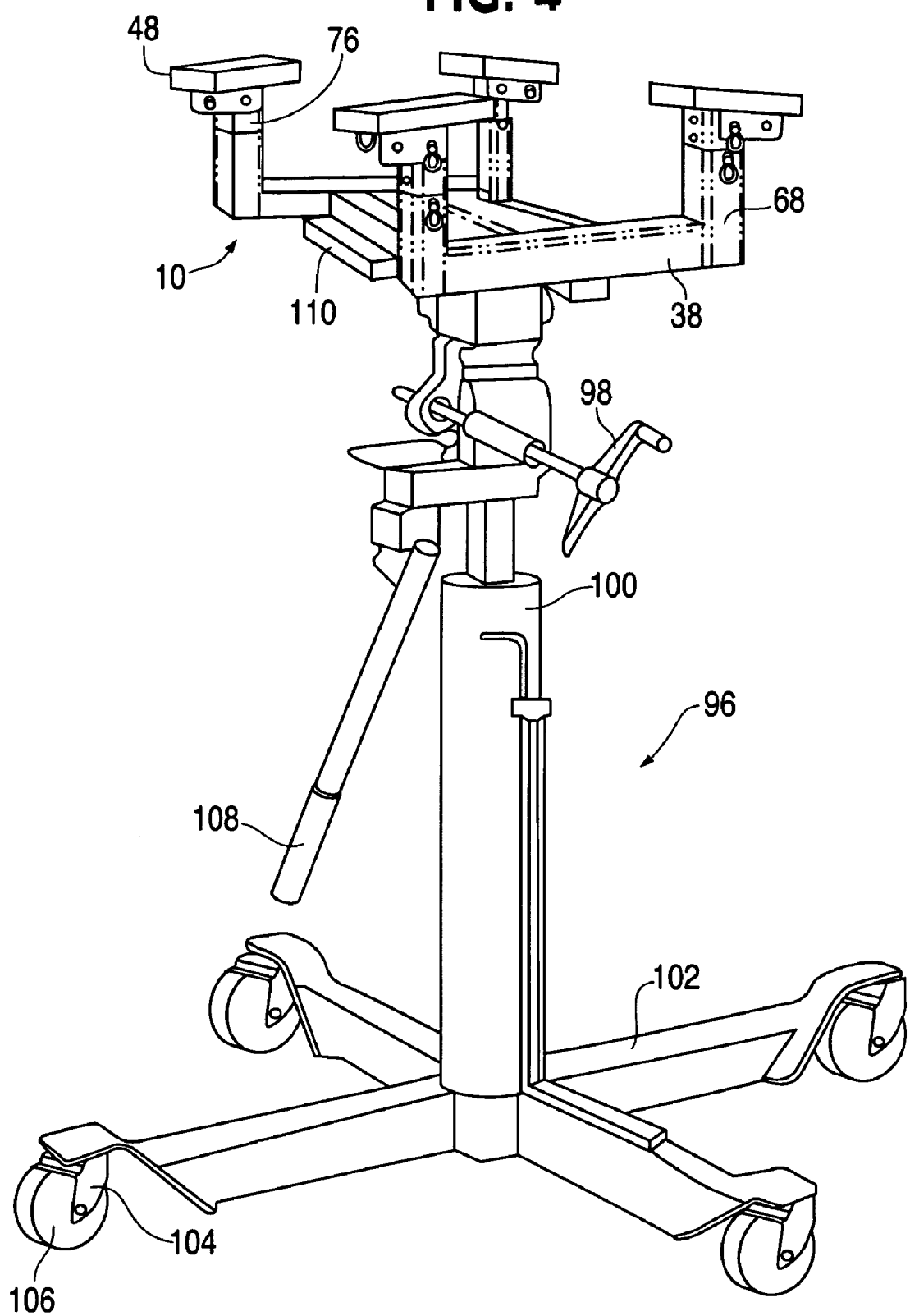
FIG. 4 is a perspective view of the support apparatus mounted on a transmission jack in accordance with one embodiment of the present invention.

FIG. 4 illustrates the ability to mount the support apparatus 10 onto another surface, such as a transmission jack 96. The support apparatus 10 is shown here with the base weldment 12, the guide tubes 20, the cross tubes 38. In addition, the figure shows the four vertical guide tubes 68, the vertical perforated tubes 76, and the pad assembly 48. The support apparatus 10 mounts by way of the base weldment 12 and the mounting slots 18 to the transmission jack 96 at a transmission jack cradle 110. A typical transmission jack 96 includes a cradle crank 98 that adjusts the tilt on the cradle 110 that maintains the support apparatus 10. In addition, the transmission jack 96 contains a vertical column 100 that couples with four horizontal legs 102. Each leg 102 contains a swivel caster 104 with wheels 106 for moving the transmission jack 96 to a desired location. Finally, the transmission jack contains a handle 108 used to operate the transmission jack 96. As one skilled in the art will readily appreciate, any type of mounting surface or jack may be used in conjunction with the support apparatus 10.

Generally, the support apparatus 10 may accommodate a vehicle component having length dimensions of between 24 and 38 inches. Thus, the perforated tubes 28 may be extended or shortened cumulatively for lengths in the above listed ranges. The support apparatus 10 may accommodate vehicle component heights of between 7 and 11 inches. Thus, the vertical perforated tubes 76 may be extended or shortened in this range. The pad 86 may be fashioned of any polymeric material, such a cross-link polyethylene foam. The support apparatus 10 footprint may either be 22 by 38 inches or 16 by 44 inches, depending on which of the positioning holes 88 is chosen. These dimensions are listed as guides and examples only and as any one skilled in the art will readily appreciate, the components of the support apparatus 10 may be designed to accommodate a variety of sizes and shapes of vehicle components.

This type of equal, but opposite displacement offered by the support apparatus 10 allows an automotive mechanic to properly balance a vehicle component of various sizes, especially when the size of the component is misjudged by the mechanic. For example, if the fuel tank is shorter than the mechanic presumed, then the mechanic would have to shorten the length of the support apparatus 10 and could push in perforated tube 28 towards the center and expect the other frame to also move in towards the center of the apparatus. This reciprocating action ensures that the fuel tank or the vehicle component is properly supported at times. Once the correct length of the support apparatus is established, the mechanic can look the support apparatus at the length via the hitch pin 25.

In contrast, if the mechanic finds that the fuel tank is larger than expected, the mechanic may pull perforated tube 28 and displace the other perforated tube 28 to lengthen the support apparatus 10 and better support the vehicle component. Thus, the mechanic no longer needs to adjust various adjustment points independently of the other and can make the adjustments more uniformly than before. This results in considerable time savings and lead to a much safer workplace environment.

The guide tubes and perforated tube can be made from hollow tubing with perforations that allow for length adjustments, such as TELESPAR® (from Unistrut, in Michigan) tubing. TELESPAR® tubes are square tubes with perforations or holes on all four sides that permit a variety of mounting possibilities. The abundance of perforations allow for numerous sizing capabilities with easy mounting, such as with simple nuts and bolts. An important feature of the TELESPAR® tubing is its ability to telescope to a variety of lengths.

Although, the support apparatus 10 finds particular application in the automotive industry to support vehicle components, it will be readily appreciated by one skilled in the art that the presently claimed invention may have broader application and in a variety of other industries. Thus, the presently claimed invention or a modification thereof may be used to support nearly any object, particularly an object requiring proper balance.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A vehicle component support apparatus comprising:
   a base that is configured to be mounted on a surface;
   at least two guide tubes coupled to the base;
   at least one perforated tube received in each of the at least two guide tubes;

a sprocket that interacts with the at least one perforated tube to allow reciprocal movement of the at least one perforated tube; and a pad assembly to support a vehicle component and coupled to the at least one perforated tube; and a cross tube that is configured to receive a vertical perforated tube and is coupled to the at least one perforated tube, wherein the pad assembly is coupled to the vertical perforated tube and that moving the cross tube causes the sprocket to interact by detaching and attaching with a perforation of the at least one perforated tube.

2. The support apparatus of claim 1, wherein the surface is a jack.

3. The support apparatus of claim 1, wherein the sprocket interacts upon moving at least one of perforated tube, and a pad assembly.

4. The support apparatus of claim 1, wherein the base includes a stirrup for receiving a strap to secure the vehicle component to the support apparatus.

5. The support apparatus of claim 1 further comprising:
a bar coupled to the at least two guide tube and receives a sprocket shaft, wherein the sprocket shaft is received in the sprocket and allows the sprocket to rotate.

6. The support apparatus of claim 1, wherein when the sprocket interacts by rotating in a first direction, an overall length of the support apparatus is lengthened.

7. The support apparatus of claim 1, wherein when the sprocket interacts by rotating in a second direction, an overall length of the support apparatus is shortened.

8. A method of securing a vehicle component, comprising the steps of:
positioning the vehicle component on a support apparatus having at least two guide tubes that receive at least one perforated tube therein, wherein the at least one perforated tube is coupled to a plurality of pad assemblies;
adjusting the at least one perforated tube reciprocally by moving one of the perforated tubes so that a sprocket interacts with a perforation in the other perforated tube thereby correctly positioning the pad assemblies to support the vehicle component; and
supporting the vehicle component on the plurality of pad assemblies, wherein the plurality of pad assemblies is coupled to a vertical perforated tube that is received in a cross tube configured to couple to the at least one perforated tube.

9. The method of claim 8 further comprising:
adjusting an angle of the plurality of pad assemblies to support the vehicle component.

10. The method of claim 8, wherein when the sprocket interacts by rotating in a first direction, an overall length of the support apparatus is lengthened.

11. The method of claim 8, wherein when the sprocket interacts by rotating in a second direction, an overall length of the support apparatus is shortened.

12. The method of claim 9 further comprising:
securing the vehicle component to the support apparatus with a strap.

13. A system for supporting a vehicle component, comprising:
a means for supporting that is configured to be mounted on a surface;
at least two means for guiding coupled to the means for supporting;
at least one perforated means for moving a pad assembly that supports the vehicle component, wherein the at least one perforated means for moving is received in the means for guiding;
a means for reciprocal movement that interacts with the at least one perforated means to move them reciprocally; and
a cross tube is configured to receive a vertical perforated tube and is coupled to the at least one perforated means for moving, wherein the pad assembly is coupled to the vertical perforated tube and that moving the cross tube causes the means for reciprocal movement to interact by detaching and detaching with a perforation of the at least one perforated means for moving.

14. The system of claim 13, wherein the surface is a work bench or a jack.

15. The system of claim 13, wherein the means for supporting includes a stirrup for receiving a strap to secure the vehicle component to the support apparatus.

16. The system of claim 13 further comprising:
a bar coupled to the at least two means for guiding and receives a sprocket shaft, wherein the sprocket shaft is received in the means for reciprocal movement and allows the means for reciprocal movement to rotate.

17. The system of claim 13, wherein when the means for reciprocal movement interacts by rotating in a first direction, an overall length of the system for supporting is lengthened.

18. The system of claim 13, wherein when the means for reciprocal movement interacts by rotating in a second direction, an overall length of the system for supporting is shortened.

* * * * *